United States Patent
Shirai et al.

(10) Patent No.: US 9,257,882 B2
(45) Date of Patent: Feb. 9, 2016

(54) VEHICLE AC GENERATOR

(71) Applicant: MITSUBISHI ELECTRIC CORPORATION, Chiyoda-ku, Tokyo (JP)

(72) Inventors: Keisuke Shirai, Chiyoda-ku (JP); Masao Akiyoshi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 225 days.

(21) Appl. No.: 13/929,207

(22) Filed: Jun. 27, 2013

(65) Prior Publication Data
US 2014/0232245 A1 Aug. 21, 2014

(30) Foreign Application Priority Data
Feb. 18, 2013 (JP) ................. 2013-028620

(51) Int. Cl.
*H02K 5/173* (2006.01)
*H02K 9/22* (2006.01)
*H02K 9/06* (2006.01)

(52) U.S. Cl.
CPC ............... *H02K 9/06* (2013.01); *H02K 5/1732* (2013.01); *H02K 9/22* (2013.01)

(58) Field of Classification Search
CPC ... H02K 5/161; H02K 5/1672; H02K 5/1732; H02K 5/1735; H02K 5/1675; H02K 5/163; H02K 5/06; H02K 5/22; H02K 5/16; H02K 5/17; H02K 5/18
USPC ............. 310/52, 54, 62, 64, 90; 384/903, 535
See application file for complete search history.

(56) References Cited

U.S. PATENT DOCUMENTS

| | | | | |
|---|---|---|---|---|
| 5,241,230 A | * | 8/1993 | Tanaka et al. | 310/62 |
| 6,417,585 B1 | * | 7/2002 | Oohashi et al. | 310/58 |
| 2006/0250039 A1 | * | 11/2006 | Yamamoto | 310/90 |
| 2008/0036314 A1 | | 2/2008 | Kanei et al. | |

FOREIGN PATENT DOCUMENTS

| | | |
|---|---|---|
| JP | 59-132358 U | 9/1984 |
| JP | 62-104552 U | 7/1987 |

(Continued)

OTHER PUBLICATIONS

Japanese Office Action (Notice of Reasons for Rejection) issued Feb. 18, 2014, Patent Application No. 2013-028620.

*Primary Examiner* — Burton Mullins
(74) *Attorney, Agent, or Firm* — Sughrue Mion, PLLC; Richard C. Turner

(57) ABSTRACT

Provided is a vehicle AC generator having a retainer attached on a bearing containing portion of a front bracket, thereby realizing temperature reduction in a bearing without deteriorating the cooling performance as a whole. In the vehicle AC generator, a front bracket 2 has a bearing containing portion 21 supporting a bearing 5 fitted therein, and an air inlet 22 that is provided along the outer circumference of the bearing containing portion 21 and allows cooling air from a fan 83 to pass therethrough. In addition, a retainer 15 is attached on the bearing containing portion 21, so as to cover the bearing 5. The retainer 15 has a planar shape, and has a fin 15b as a surface area increasing portion for increasing an area of contact with the cooling air, formed at a position facing to and outside the air inlet 22 in the shaft direction.

7 Claims, 4 Drawing Sheets

(56) References Cited

FOREIGN PATENT DOCUMENTS

| | | |
|---|---|---|
| JP | 63-121455 A | 5/1988 |
| JP | 5-2561 U | 1/1993 |
| JP | 2007-124796 A | 5/2007 |
| WO | 2005-124971 A1 | 12/2005 |

* cited by examiner

F I G. 1
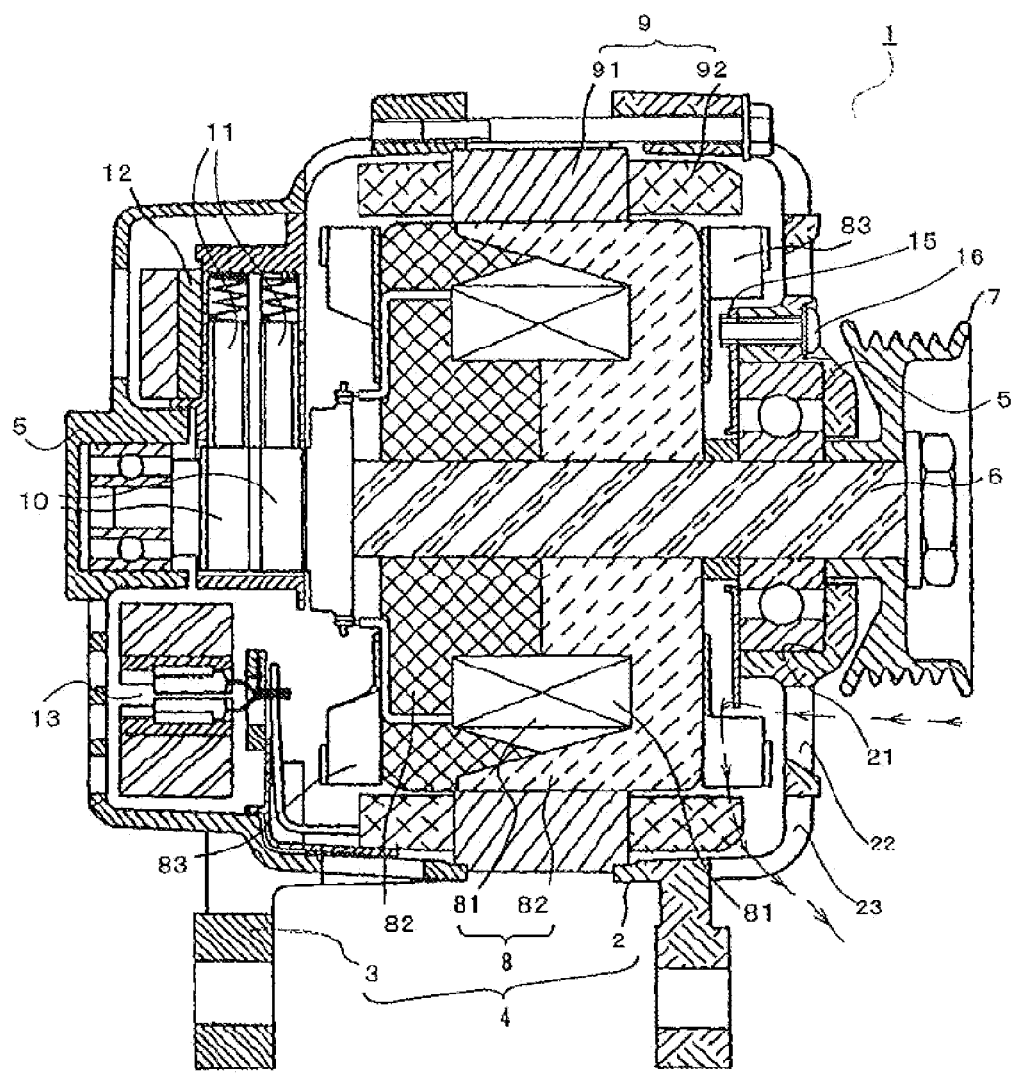

VEHICLE AC GENERATOR

BACKGROUND OF THE INVENTION

1. Field of the Invention

The present invention relates to improvement in cooling performance of a vehicle AC generator provided as a rotary electric machine on a vehicle or the like.

2. Description of the Background Art

As a conventional vehicle AC generator, Patent Document 1 (Utility Model Application Publication No. 5-2561) shows a vehicle AC generator having partition limbs with a clearance provided at its tip, the partition limbs radially extending from a bearing supporting portion of a front bracket, to partition an air inlet into multiple sections, and also preventing entry of relatively large foreign material from outside.

In such a configuration, even if a part of heat generated on a stator portion is transmitted to the front bracket through a stator iron core coupled by the front bracket and a rear bracket, only an arm portion is a path to the bearing supporting portion and therefore heat transmission to a bearing is reduced. In addition, the partition limbs extending from the bearing supporting portion function as radiating fins to release heat, thereby suppressing temperature increase in the bearing.

In addition, Patent Document 2 (Japanese Laid-Open Patent Publication No. 63-121455) shows a vehicle AC generator having partition limbs on an air inlet, formed by ribs provided on the outer circumference of a bearing retainer for bearing fixing.

This configuration makes it possible to, on the front attachment retainer for providing an effect of sizing up a fan and eventually improving the fan performance, form ribs that can prevent entry of foreign material at the air inlet and that are thinner than those provided for a die-cast front bracket, so as not to hinder ventilation.

The partition limb for heat release of Patent Document 1 is held at its one side by an aluminum-cast bracket. Therefore, if the axial length of the limb is extremely decreased or the thickness is decreased, a problem occurs with the strength of the limb as a part composing a product.

In addition, since the radial-direction length of the limb occupies almost the whole radial-direction width of the air inlet, the limb creates air flow resistance against the air inlet to no small extent. Thus, even though the limb may provide an effect of suppressing temperature increase in the bearing, the limb can deteriorate the cooling performance of the vehicle AC generator.

On the other hand, the retainer of Patent Document 2 mainly has a role to fix the bearing, and has a "foreign material entry preventing structure that does not reduce the air inlet area" as an accompanying structure. At any rate, an effect of aggressively reducing the temperature is not taken into consideration.

SUMMARY OF THE INVENTION

The present invention has been made to solve such conventional problems, and an object of the present invention is to provide a vehicle AC generator having a retainer attached on a bearing containing portion of a front bracket, thereby realizing temperature reduction in a bearing without deteriorating the cooling performance as a whole.

A vehicle AC generator of the present invention includes: a stator; a front bracket and a rear bracket holding the stator therebetween; a rotor fixed on a rotary shaft supported by the front bracket and the rear bracket via a bearing; and a fan provided at least on a front side of the rotor. The front bracket has a bearing containing portion supporting the bearing fitted therein, and an air inlet that is provided along the outer circumference of the bearing containing portion and allows cooling air from the fan to pass therethrough. A retainer is attached on the bearing containing portion, so as to cover the bearing. The retainer has a planar shape, and has a surface area increasing portion for increasing an area of contact with the cooling air, the surface area increasing portion being formed at a position facing to and outside the air inlet in the shaft direction.

According to the present invention, an effect is provided that, with a simple configuration effectively using the retainer attached on the bearing containing portion of the front bracket, temperature reduction in the bearing can be realized without deteriorating the cooling performance of the vehicle AC generator as a whole.

The foregoing and other objects, features, aspects and advantages of the present invention will become more apparent from the following detailed description when read in conjunction with the accompanying drawings.

BRIEF DESCRIPTION OF THE DRAWINGS

FIG. 1 is a sectional view of a vehicle AC generator according to the first embodiment of the present invention;

DETAILED DESCRIPTION OF THE PREFERRED EMBODIMENTS OF THE INVENTION

First Embodiment

Figure 2:
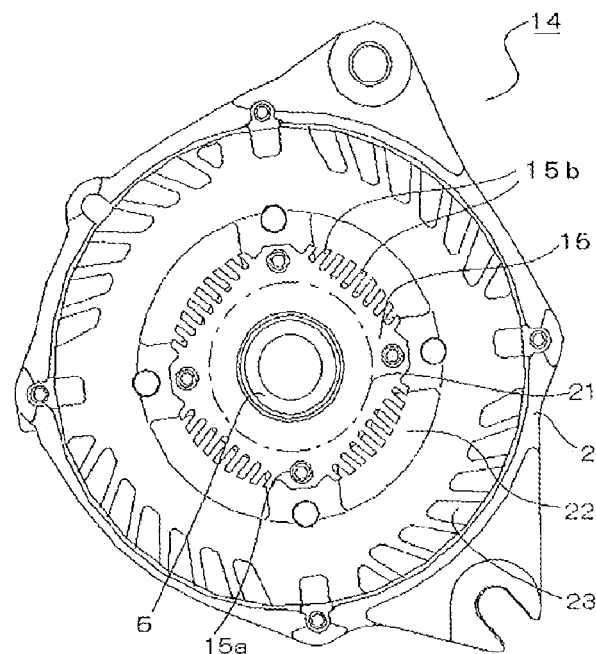
FIG. 2 is a plane view of a front bracket assembly unit shown in FIG. 1, as seen from the inside of the generator.

FIG. 1 is a sectional view of a vehicle AC generator according to the first embodiment of the present invention.

A vehicle AC generator 1 includes: a casing 4 composed of a front bracket 2 and a rear bracket 3 each having a substantially bowl shape and made of aluminum; a shaft 6 rotatably supported via a pair of bearings 5 by the casing 4; a pulley 7 fixed on the end of the shaft 6 extending out on the front side of the casing 4; a rotor 8 provided in the casing 4 and fixed on the shaft 6; a stator 9 fixed on the casing 4 so as to surround the rotor 8; a pair of slip rings 10 for supplying current to the rotor 8, fixed on a portion of the shaft 6 extending out on the rear side of the casing 4; a pair of brushes 11 sliding on the surfaces of the respective slip rings 10; a voltage adjustment device 12 adjacent to the brushes 11, for adjusting the magnitude of AC voltage caused on the stator 9; and a rectification device 13 for rectifying the AC voltage caused on the stator 9 into DC voltage.

The rotor 8 is a Lundell-type rotor, and has: a field winding 81 that generates a magnetic flux when exciting current is applied thereto; and a pole core 82 which is provided so as to cover the field winding 81 and on which a magnetic pole is generated by the magnetic flux.

Fans 83 are fixed on both end surfaces facing in the shaft direction, of the rotor 8. The fans 83 introduce external air into the generator by rotation of the rotor 8, cool constituent components in the generator with the air, and then discharge the air.

The stator 9 has a cylindrical stator iron core 91, and a stator winding 92 wound on the stator iron core 91 on which AC current is caused by change in the magnetic flux from the field winding 81 along with rotation of the rotor 8.

The stator 9 is provided so as to surround the rotor 8, with the stator iron core 91 being held by the open ends of the front bracket 2 and the rear bracket 3 from both sides in the shaft direction.

The bearing 5 is assembled into the bearing containing portion 21 of the front bracket 2, a retainer 15 is provided so as to cover almost the whole outer circumference of the bearing 5, and they are fastened by a screw 16 from the outside of the front bracket.

FIG. 2 is a plane view of a front bracket assembly unit 14 in which the bearing 5 is assembled to the front bracket 2, as seen from the inside of the generator.

As shown in FIG. 2, the front bracket 2 has: the bearing containing portion 21 supporting the bearing 5 fitted therein; and an air inlet 22 which is provided along the outer circumference of the bearing containing portion 21 and allows cooling air taken in by the fan 83 to pass therethrough. In addition, the retainer 15 provided so as to cover the bearing 5 is attached to the bearing containing portion 21 by the screw 16 screwed into a screw hole 15a.

Screw fastening portions are provided in the surrounding area around the outer circumference of the bearing, at four positions shown in FIG. 2 or three positions.

Figure 4:
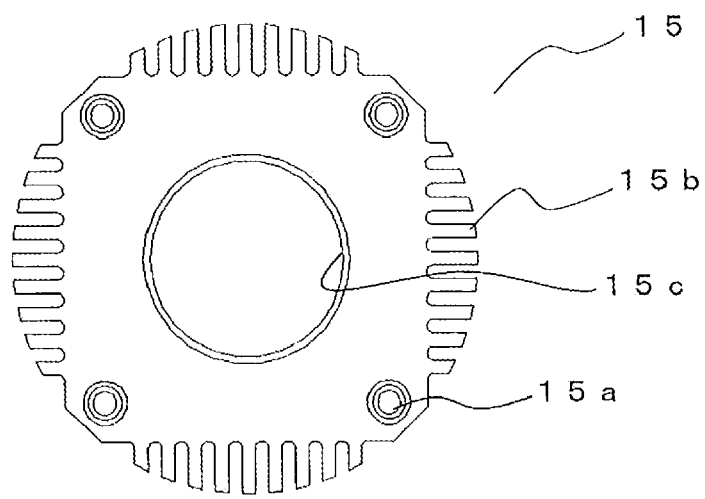
FIG. 4 is a plane view showing a retainer according to the first embodiment.

FIG. 4 is a plane view showing the retainer 15. The retainer 15 is a flat plate made of steel and having an annular shape. A shaft hole 15c that allows the shaft 6 to be inserted therethrough is formed on the center portion of the retainer 15. A plurality of fins 15b radially extending and serving as a surface area increasing portion for increasing an area of contact with cooling air from the fan 83, are formed, between adjacent screw holes 15a, on the peripheral portion of the retainer 15.

It is noted that instead of providing the plurality of fins 15b in parallel to each other in a radial direction as shown in FIG. 2, the plurality of fins 15b may be radially provided.

Figure 3:
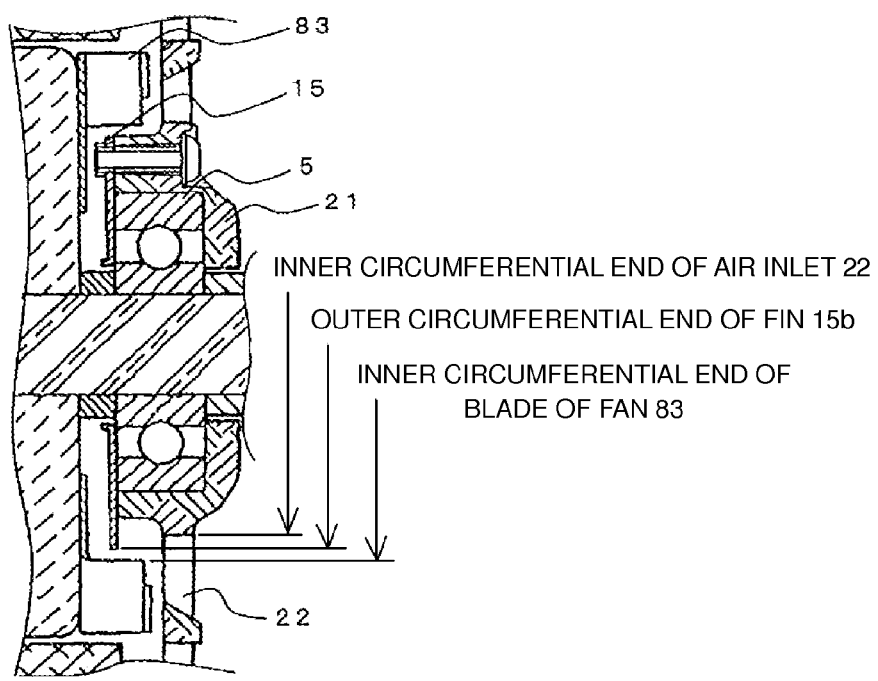
FIG. 3 is an enlarged view of a specific part of FIG. 1.

As shown in FIG. 3, a virtual line (circle) connecting the tips of the fins 15b is closer to the shaft center side than a virtual line (circle) connecting the inner circumferential ends of blades of the fan 83 of the rotor 8. Therefore, the fins 15b do not interfere with the fan 83.

In addition, the fins 15b extend radially outward beyond the inner circumference of the air inlet 22 provided so as to face to the blades of the fan 83 in the shaft direction, so that the fins 15b are subjected to passing air (cooling air) introduced through the air inlet 22 and discharged from an air outlet 23 (see FIG. 1).

It is noted that the fan 83 shown in FIG. 1 has a side plate for rectification attached on the blade end. However, the flow amount and the like do not greatly change even in the case of providing only a blade, and therefore either case can be employed.

The air inlet 22 of the front bracket 2 is provided in a fan-like shape at four positions along the outer circumference of the bearing containing portion 21 as shown in FIG. 2, for example. The fins 15b of the retainer 15 do not enter the inside space of the air inlet 22 (see FIG. 3).

Thus, a portion that can block passing air introduced in the shaft direction from the outside by the fan 83 through rotation of the rotor 8 is not present in the inside space of the air inlet 22, and therefore the maximum air flow amount is ensured in the air inlet 22.

That is, ventilation efficiency of air flowing to the stator 9 and the rotor 8 which are cooling targets present in back of the air inlet 22, can be improved with the same opening area of the air inlet 22 as the conventional one and without changing the size of the generator.

It is noted that the retainer ribs 17a of Patent Document 2 are present in the air inlet space even though they are thin, and therefore the air inlet space is not utilized maximally (see FIG. 1 of Patent Document 2).

The above fan-shaped air inlet 22 has been employed because: a great effect of increasing the inlet air flow amount can be obtained owing to absence of small partitions; and actually, even if such partitions are not provided, there is no past record that relatively large foreign material has entered.

As a result, heat generated on the stator is transmitted to the bearing containing portion 21 only via a wall portion between the adjacent air inlets. Therefore, the heat transmission amount is reduced as compared to the case of providing small partitions, and the maximum air flow amount is ensured in the air inlet 22. Owing to such effects and further a cooling effect provided by the fins 15b of the retainer 15 in contact with the side surface of the bearing 5, the vehicle AC generator 1 has a preferable balance of cooling performance as a whole and therefore is excellent as a product.

In addition, slits present on the outer circumference of the retainer 15 which form the fins 15b are formed upon sheet-metal work for the plate-like retainer 15 at the same time. Therefore, a process such as cupping work needed for manufacturing the retainer of Patent Document 2 is not needed, and the retainer 15 can be manufactured with low cost.

Figure 5:
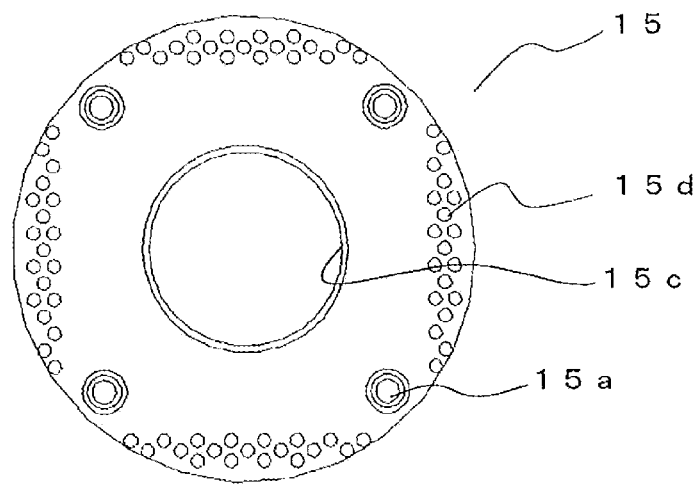
FIG. 5 is a plane view showing another example of a retainer according to the first embodiment.

Further, the fins 15b provided on the retainer 15 may be formed by a plurality of through-holes 15d, for example, as shown in FIG. 5, instead of slits shown in FIG. 4.

In this case, the machinability and the durability of a manufacture punching die are enhanced as compared to the case of the slit-like fins 15b, and thus the configuration shown in FIG. 5 is suitable for mass production.

In the above description, the screw 16 is screwed into the front bracket 2 from the outside of the vehicle AC generator 1. However, the screw 16 may be screwed from the inside. In addition, in the above description, the bearing containing portion 21 opens toward the inside of the vehicle AC generator 1. However, the bearing containing portion 21 may open outward and the retainer 15 may be attached from the outside. Thus, various options can be employed.

Also, regarding the number of screw fastening portions and the number of corresponding ribs of the front bracket, the above case is merely an example, and they are not limited thereto.

In addition, the above vehicle AC generator 1 has its components contained inside the casing 4 having a substantially bowl shape, but is not limited thereto. The present invention can be applied to other types of generators such as a generator that has the components (slip ring 10, brush 11, voltage adjustment device 12, rectification device 13, and the like) provided outside the rear bracket 3 and has a resin cover for protecting them, as long as its bearing configuration on the front side is similar to the above-described configuration.

Second Embodiment

Figure 6:
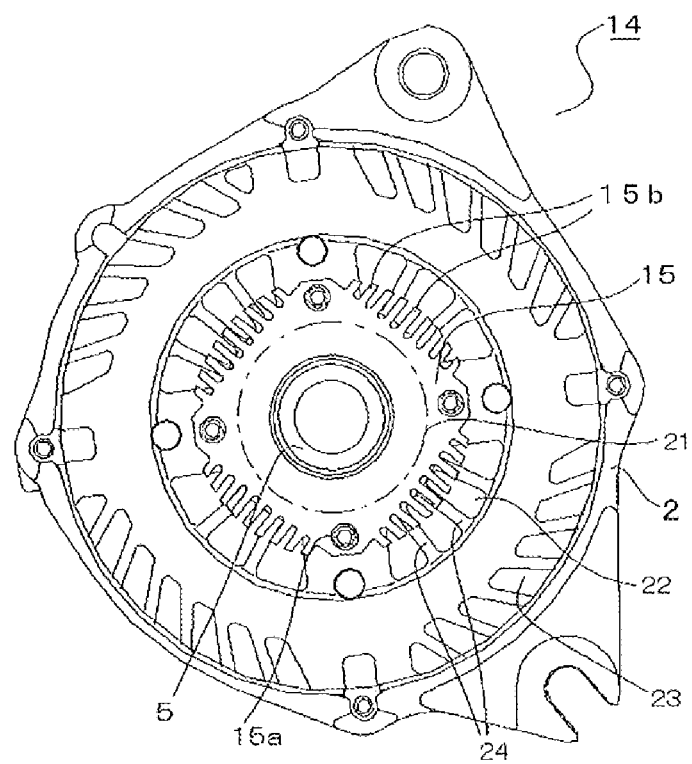
FIG. 6 is a plane view of a front bracket assembly unit according to the second embodiment of the present invention, as seen from the inside of the generator.

FIG. 6 is a plane view of a front bracket assembly unit according to the second embodiment of the present invention, as seen from the inside of the generator.

In the first embodiment, ribs are not provided on the air inlet 22 of the front bracket 2. On the other hand, in the second embodiment, the above retainer 15 is applied to the front bracket 2 having ribs 24 similar to those of the conventional technique.

In this case, air flow resistance in the air inlet 22 is not improved from the conventional technique, but the temperature increase in the bearing 5 can be suppressed.

In addition, it is only necessary to replace one component, i.e., a retainer, with the above retainer 15, while the front bracket 2 whose specifications are different depending on the vehicle attachment condition can be used in a conventional fashion. Therefore, the performance can be improved with almost no cost increase.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A vehicle AC generator comprising:
    a stator;
    a front bracket and a rear bracket holding the stator therebetween;
    a rotor fixed on a shaft supported by the front bracket and the rear bracket via a bearing; and
    a fan provided at least on a front side of the rotor, wherein
    the front bracket has a bearing containing portion supporting the bearing fitted therein, and an air inlet that is provided along the outer circumference of the bearing containing portion and allows cooling air from the fan to pass therethrough,
    a retainer is attached on the bearing containing portion, so as to cover the bearing, and
    the retainer has a planar shape, and has a surface area increasing portion for increasing an area of contact with the cooling air, the surface area increasing portion being formed at a position facing to and outside the air inlet in the shaft direction, the planar shape extending from a portion attached to the bearing containing portion, to an outer circumferential end of the retainer, and including the surface area increasing portion.

2. The vehicle AC generator according to claim 1, wherein the outer circumferential end of the retainer including the surface area increasing portion is closer to the center side of the shaft than the inner circumferential end of a blade of the fan.

3. The vehicle AC generator according to claim 1, wherein the surface area increasing portion of the retainer is formed by a plurality of fins extending in a radial direction.

4. The vehicle AC generator according to claim 1, wherein the surface area increasing portion of the retainer is formed by a plurality of through-holes.

5. The vehicle AC generator according to claim 1, wherein
    the retainer has an annular shape, and has a shaft hole that allows the shaft to be inserted therethrough, formed on the center portion of the retainer, and
    the surface area increasing portion is formed on the peripheral portion of the retainer.

6. The vehicle AC generator according to claim 1, wherein the air inlet of the front bracket is formed by a fan-shaped opening having no partition.

7. The vehicle AC generator according to claim 1, wherein the air inlet of the front bracket has a rib.

* * * * *